United States Patent Office 3,133,122
Patented May 12, 1964

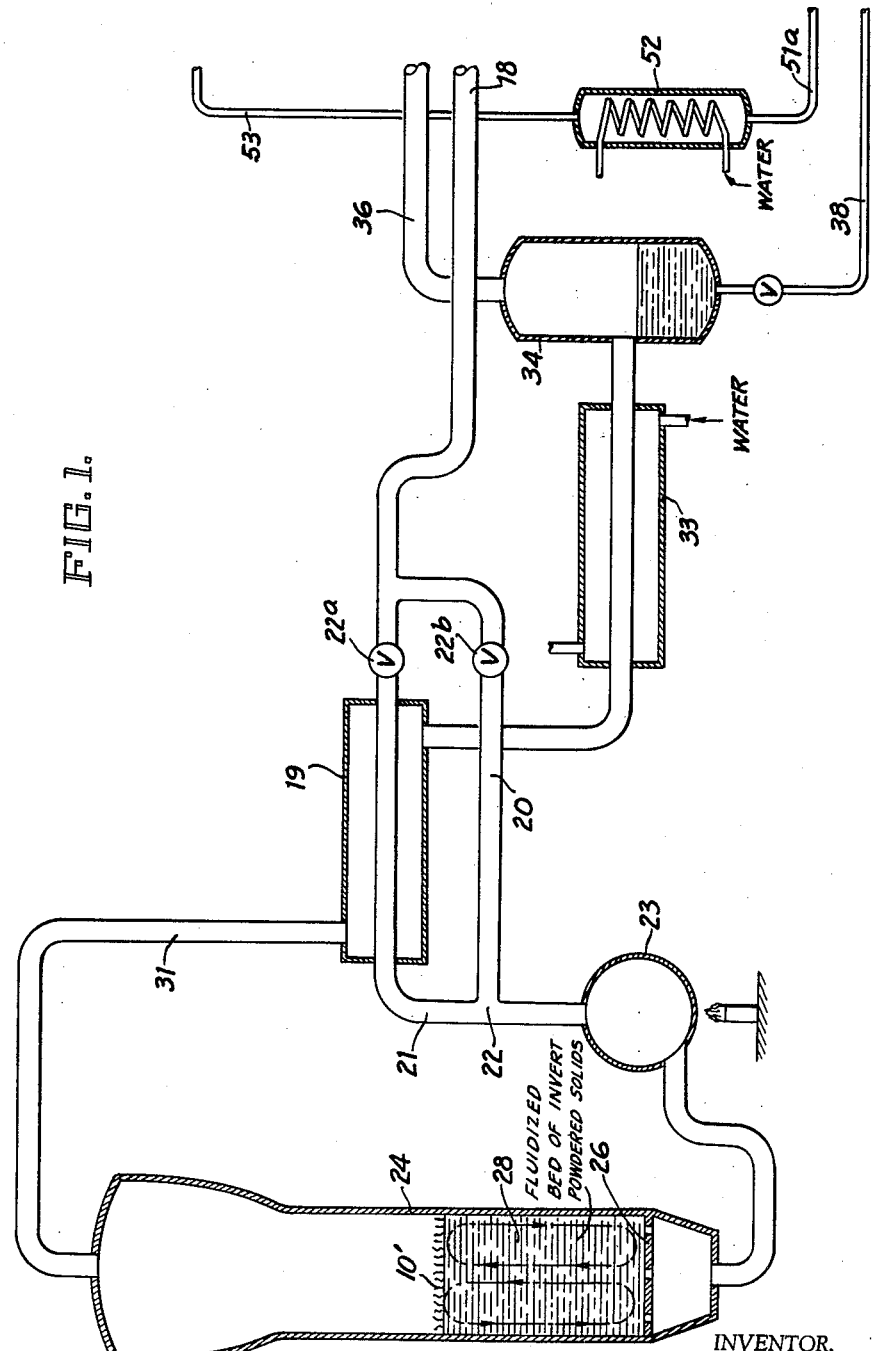

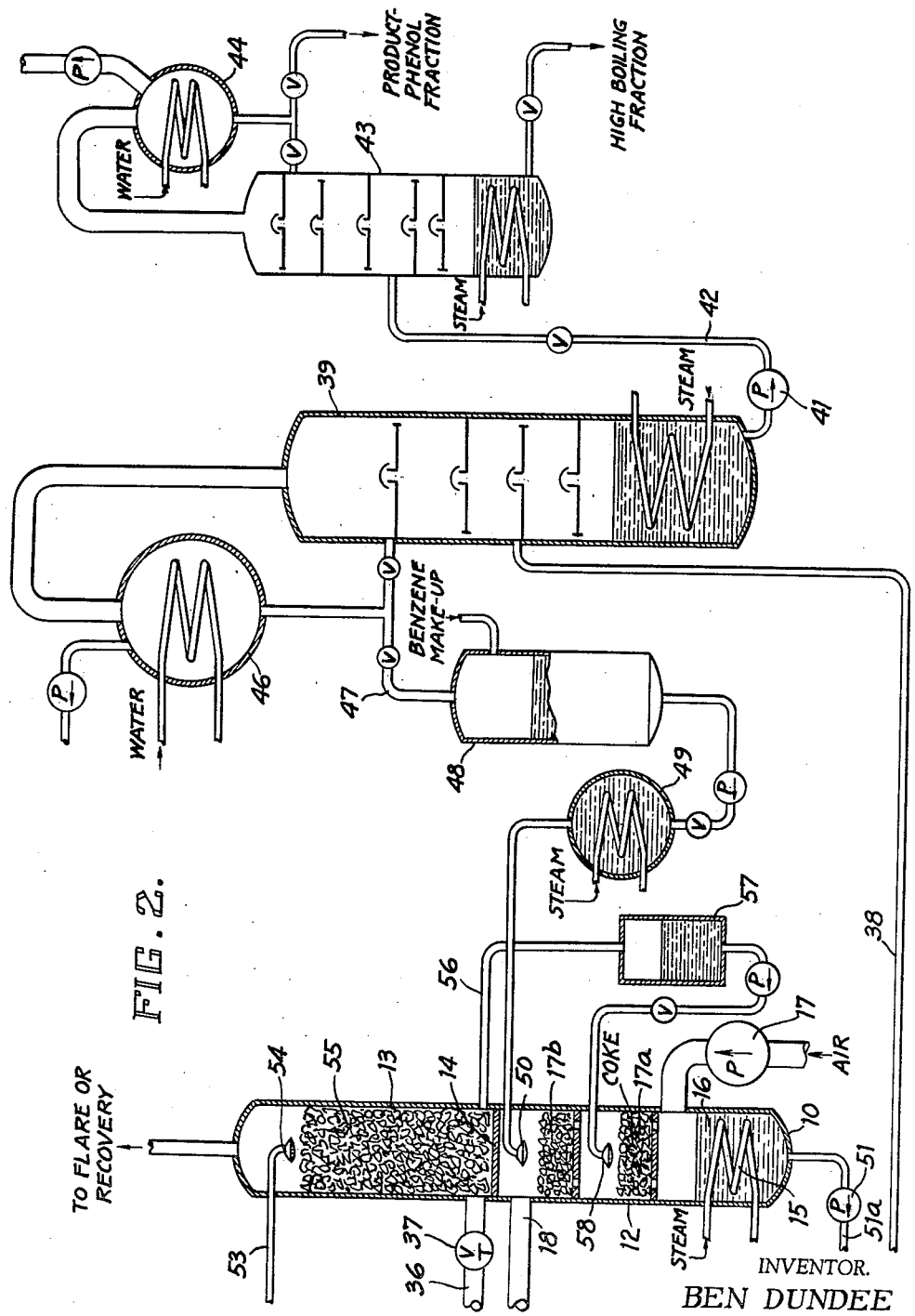

3,133,122
METHOD OF MANUFACTURING PHENOLS
Ben Dundee, 1 Highwood Way, Larchmont, N.Y.
Filed July 22, 1960, Ser. No. 46,864
6 Claims. (Cl. 260—621)

This application relates to the manufacture of phenols by oxidation of benzene and toluene in the vapor phase.

The oxidation of benzene to produce phenol is a well known chemical reaction. This reaction is favored by high temperature and absence of catalysts. Patent No. 2,223,383 by Moyer and Klinghoefer describes an invention relating to this process. One of the major difficulties involved in the process as described in the above patent is temperature control. Precise temperature control is required to assure good yields. Precise temperature control minimizes side reactions and the formation of unwanted by-products. Past efforts to produce a commercial yield of phenols by direct oxidation of benzene and toluene have been unsuccessful because of the difficulty in controlling the reaction, and especially the difficulty in controlling the temperature thereof.

An object of this invention is to provide a method of oxidizing benzene or toluene in the vapor phase in the presence of an oxygen-rich gas to form commercial yields of phenols.

A further object of this invention is to provide a method of performing such an oxidation in which a uniform temperature is maintained in the reaction zone.

In accordance with the process of the present invention, a fluidized bed of bauxite, or any material inert to the reaction such as sand, is used to control reaction temperatures. A mixture of benzene or toluene vapors and oxygen-containing gas is preheated and introduced into a reactor containing finely divided sand, bauxite, or other material which is inert to the reaction. This solid bed is fluidized by the gases and the reaction proceeds in the reactor above the fluid bed, i.e. in a zone adjacent to and contiguous to the fluid bed. The overall fluidized bed appears to operate after the manner of a mixing chamber in which the fluidized particles act as a temperature moderator. The mixture discharged from the bed is ignited or flamed in the aforesaid zone to form phenols with a minimum of a diphenyl, formaldehyde, and other side reaction products etc. and with practically complete elimination of carbon formation as evidenced by the absence of carbon deposits and its fouling of the bed and associated equipment including the reactor. The reaction in the fluid zone or combustible area immediately above the fluid bed liberates heat, and a sufficient amount of cold gas is introduced into the fluid bed to maintain a substantially constant bed temperature by reason of the absorption of heat from the flamed zone by the bed and its transfer throughout the bed.

The fluid bed reactor maintains the reaction temperature within approximately 10° C. of the desired temperature in the flaming zone. The reaction is carried out at a temperature between about 300 and 750° C. and at pressures from about 1 to 45 atmospheres in the flame zone notably 650° C. and 5 atmospheres. The temperature of the fluidized bed is about 100° C. below that of the flaming zone above the bed. The bed temperature is preferably 550° C. at 5 atmospheres pressure. The flame temperature, i.e. of the zone above the bed may be varied by introducing more or less oxygen containing gas. By volume the ratio of reactive oxygen to the aromatic compound is between about 1 to 20 and 1 to 4. Pure oxygen or an oxygen rich gas are used as alternatives for air. In all cases the mol ratio of benzene or toluene to oxygen employed in this process is at least greater than 1. The reaction temperature is related to the absolute pressures and can be carried as low or high as required as long as the pressure can be maintained in the reaction vessel. Higher pressures than 5 atmospheres can be used e.g. 10 atmospheres or more if the economics of the process require. The conversion of benzene to phenol is favored by high pressure.

The fluid bed reactor in which the reaction takes place is a container containing a divided solid material in any suitable size distribution. In a preferred fluid bed, the particle size can average 40 mesh. The solids can be transported in and out of the reactor for heat control or may remain in the reactor as charged. Either type of fluid bed, i.e. either the stationary bed or the moving bed can be used in the reaction of this invention. The reactor is constructed of any suitable material and contains as one of its major components a gas distributor in the bottom or lower section to efficiently distribute the gas. Sufficient gas is introduced to lift the particles off the bottom and circulate them within the reactor. The present invention uses this fluid bed not only for temperature control as applied to the oxidation of benzene, toluene, and other higher homologues of benzene but to prepare the reactants to such a condition that favors immediate conversion to phenols within the flamed zone. The flamed zone in which the reaction proceeds is above the fluidized bed, adjacent and contiguous to the same and is characterized by having a temperature higher than that of the fluidized bed as a result of the heat of reaction in the flaming zone.

In addition to phenols, the oxidation of benzene, toluene and their homologues by the process of the present invention results in the formation of quantities of diphenyl, formaldehyde and cracked reaction gases as reaction products. These can be kept to values of below 40% of the reaction products by selection of proper temperature, pressure, and excess oxygen and because of the precise control of reaction temperature made possible by the use of the fluid bed reactor.

As indicated in the Moyer et al. patent referred to above, certain materials adversely affect the reaction and cause yield of less phenol and more by-product. All the surfaces of the reactor are lined with an inert material such as aluminum oxide brick or can be covered with sprayed aluminum oxide to prevent the decomposition of the products formed in the reactor.

The above and other features of this invention will be apparent to those skilled in the art to which this invention pertains from the following detailed description of an example of an embodiment of the invention as applied to the oxidation of benzene to produce commercial yield of phenol, together with the accompanying drawings in which:

FIGURE 1 is a schematic view of a portion of apparatus for carrying out an embodiment of this invention; and FIGURE 2 is a schematic view of the remainder of the apparatus.

In FIG. 2 the numeral 10 indicates a tower having a lower section 12 and an upper section 13 separated by a plate 14. The lower section of the tower 10 forms a zone in which benzene is vaporized by the action of steam in a coil 15, heating a liquid mixture 16 of benzene and a benzene capturing liquid such as the "straw" oil used for absorbing benzene from coke oven gases. Air is pumped into the lower section of the tower by a pump 17 and mixes with the benzene vapors. The pump 17 preferably supplies the air at a pressure of two to three atmospheres absolute pressure. The mixture of benzene and air passes through coke beds 17a and 17b where additional benzene vapors are picked up into a line 18. A portion of the benzene-air mixture from the line 18 is directed through a heat exchanger 19 (FIG. 1) while a separate portion thereof is directed through a line 20. The line 20 meets a discharge line 21 from the heat exchanger 19 at a point 22. Flow through the lines 20 and 21 is controlled by valves 22a and 22b. The benzene-air mixture is passed through a start-up heater 23 to the bottom of a reactor tower 24. In the tower 24, the benzene-air mixture passes through a perforated plate 26 and into a fluid bed 28 of inert powdered material in which the mixture of benzene and air are prepared. The reaction that takes place in the zone 10' adjacent and contiguous to the fluidized bed is shown. As the benzene-air mixture passes through the fluid bed, the fluid bed circulates in the manner indicated by arrows in the drawing. The particles of the bed can be any appropriate material such as bauxite or sand or the like which is inert to the reaction and has no catalytic effect therein and which can withstand the temperatures involved in the reaction. The particles may be of any appropriate size and preferably of a size such as to average 40 mesh. In a preferred bed no particles are larger than 40 mesh and all particles are held by a 100-mesh screen. As the reaction progresses, heat is liberated and the temperature of the bed is controlled by adjusting valves 22a and 22b to control the proportion of entering gas which is preheated before entry into the bed.

The fluid bed serves to maintain a substantially constant temperature in the reaction or flaming zone 10' above, i.e. adjacent to and contiguous to the fluidized bed.

Reaction products leaving the fluid bed, pass upwardly through the upper section of the reactor tower 24 where the particles of the fluid bed are separated from the reaction products. From the reactor tower 24, the reaction products pass through a line 31 to the heat exchanger 19 where the reaction products pass in heat exchange relation with a portion of the feed gases moving toward the reactor tower 24. From the heat exchanger 19, the reaction products pass through a water cooled condenser 33 where normally liquid reaction products such as phenols, unreacted benzene, and high boiling by-products are condensed. From the condenser 33 the reaction products pass into a product receiver 34 where normally gaseous by-products are separated from normally liquid products, unreacted benzene, and high boiling by-products. Gases from the receiver 34 pass through a line 36 into the upper section 13 of the tower 10. A throttle valve 37 in the line 36 controls the pressure in the reactor and other elements described in detail to this point.

Liquid from the receiver 34 passes from the receiver through a line 38 to fractionating column 39, where unreacted benzene is stripped from the phenol product and high boiling by-products. The bottoms from the fractionating column 39 are pumped by a pump 41 through a line 42 to a second fractionating column 43. The gaseous product from the top of the column 43 is condensed in a condenser 44 as product phenol. The bottom fraction from the column 43 includes high-boiling by-products such as di-phenyl. Benzene from the top of the column 39 is condensed in a condenser 46 and passed through a line 47 to a benzene make-up receptacle 48 where additional benzene is added. From the make-up receptacle 48, the benzene is pumped through a preheater 49 to a spray head 50 inside the lower section 12 of the tower 10 where the benzene is sprayed on the coke bed 17b and is vaporized by the air-benzene mixture passing upwardly through the lower section 12 of the tower 10.

Lean straw oil from the bottom of the lower section 12 of the tower 10 is pumped by a pump 51 through a line 51a to water-cooled cooler 52 and, from the cooler 52, through a line 53 to a spray head 54 near the top of the upper section 13 of the tower 10 where the cool, lean straw oil is sprayed on a coke bed 55. In the coke bed 55, the lean straw oil comes in contact with the vapor materials from the product receiver 34, and any benzene vapor therein is absorbed by the straw oil. Remaining gaseous materials from the top of the upper section 13 of the tower 10, such as formaldehyde, methane, and carbon monoxide can be flared or can be water-scrubbed to recover formaldehyde.

The benzene-rich straw oil from the bottom of the upper section 13 of the tower 10 passes through a line 56 to a straw oil receiver 57, from which it is pumped to a spray head 58. The spray head 58 distributes the benzene-rich straw oil on the coke bed 17a where benzene therein is stripped therefrom by hot benzene vapors and air passing upwardly through the coke bed 17a.

The benzene-air ratio in the gaseous mixture entering the reactor tower is adjusted to a ratio of approximately fifty percent (50%) air and fifty percent (50%) benzene or toluene by volume, and this ratio is preferably maintained constant for any particular run. The gas mixture entering the reactor tower includes approximately ten percent (10%) oxygen, fifty percent (50%) benzene, and forty percent (40%) inert gases by volume and the mol ratio of oxygen to benzene is approximately one to five. There is nothing critical about these ratios except as stated they should be maintained substantially constant throughout a particular run and the aromatic should always be in excess of the oxygen. A ratio of 65% benzene and 35% air also gave satisfactory results.

During the starting-up of the apparatus, the gases approaching the reactor tower 24 are heated by the start-up heater 23 to a temperature of about 400° C. to 500° C. Once the reactor is in operation, the heat of reaction is sufficient to maintain the temperature and the start-up heater can be turned off. Thereafter, the heat exchanger 19 serves to heat the incoming gases to a temperature of about 400° C. to 500° C. The temperature of the incoming gases is adjusted by varying the size of the portion thereof which is by-passed through the line 20. In the heat exchanger 19, the product gases can be cooled to a temperature of about 200° C. to 250° C.

The tower 10 is shown provided with coke packings, but other appropriate packings may be used in place thereof.

The reaction zone or flaming zone extending above the bed is shown at 10' in FIGURE 1 and it is to be understood that I have discovered that the reaction takes place in the flaming zone 10' in accordance with the disclosure of my application Serial No. 752,704, filed August 4, 1958, now abandoned, of which this application is a continuation-in-part.

In the foregoing detailed description, the oxidation of benzene to produce a commercial yield of phenol has been described. In a similar manner, toluene can be oxidized by oxygen from the air to produce yields of cresols.

In accordance with this invention, mixtures of benzene and toluene are also oxidized to produce phenols.

Where, in the appended claims, the oxidation of both benzene and toluene is defined, the term "phenol" is employed in its generic sense to include cresol. In claims relating to oxidation of benzene only, the term has been employed in its specific sense to designate the compound $C_6H_5OH$.

In carrying out this invention the period of contact of the gases in the fluid bed and the reaction zone 10' immediately above the same is not critical, i.e., the retention time in the reactor is not of particular significance. The important consideration which I have observed is the reaction which takes place above the fluidized bed in the flaming zone 10'.

Having described my invention, what I claim as new, and desire to secure by Letters Patent is:

1. The method of producing a phenol from an aromatic compound selected from the group consisting of benzene, toluene and mixtures of benzene and toluene which comprises passing a preheated mixture of the aromatic compound in gaseous form and an oxygen containing gas under pressure of at least about one atmosphere through a fluid bed of finely divided noncatalytic, nonreactive solid material, the temperature of the gases as they leave the bed and the amount of oxygen present therein being effective to produce a flame with a temperature up to 750° C., said flame being immediately above and contiguous to said bed, the temperature in the bed being maintained about 100° C. below the temperature above the bed whereby a phenol is formed, and separating the phenol.

2. The method according to claim 1 wherein the reaction takes place under a pressure from 1, to and including 45 atmospheres.

3. The method according to claim 2 wherein the volume ratio of the reactive oxygen to aromatic compound is between 1 to 20 and 1 to 4.

4. The method according to claim 3 wherein the aromatic compound is benzene.

5. The method according to claim 3 wherein the aromatic compound is toluene.

6. The method according to claim 3 wherein the aromatic compound is a mixture of benzene and toluene.

References Cited in the file of this patent

UNITED STATES PATENTS

| | | |
|---|---|---|
| 2,223,383 | Moyer et al. | Dec. 3, 1940 |
| 2,373,008 | Becker | Apr. 3, 1945 |

OTHER REFERENCES

Kalbach: Chemical Engineering, volume 54 (1947), 105–108.